(12) United States Patent
Babbitt et al.

(10) Patent No.: US 10,415,934 B2
(45) Date of Patent: Sep. 17, 2019

(54) SELF-ALIGNING OPTICAL SIGHT MOUNT

(71) Applicant: Burris Company, Inc., Greeley, CO (US)

(72) Inventors: Eric Lee Babbitt, Fort Collins, CO (US); Matthew Travis White, Fort Collins, CO (US)

(73) Assignee: BURRIS COMPANY, INC., Greeley, CO (US)

( * ) Notice: Subject to any disclaimer, the term of this patent is extended or adjusted under 35 U.S.C. 154(b) by 36 days.

(21) Appl. No.: 15/053,861

(22) Filed: Feb. 25, 2016

(65) Prior Publication Data
US 2016/0252330 A1    Sep. 1, 2016

Related U.S. Application Data

(60) Provisional application No. 62/121,612, filed on Feb. 27, 2015.

(51) Int. Cl.
*F41G 1/387* (2006.01)
*F41G 11/00* (2006.01)
*F16B 2/06* (2006.01)

(52) U.S. Cl.
CPC ............ *F41G 11/003* (2013.01); *F16B 2/065* (2013.01); *F41G 11/001* (2013.01)

(58) Field of Classification Search
CPC ...... F41G 11/001; F41G 11/003; F16B 2/065; F16B 2/06; F16B 2200/403; F16B 2200/406; F16L 3/1016; F16L 3/1008; F16M 11/10

USPC .... 248/315, 230.1, 230.5, 316.6, 74.1, 74.4, 248/222.51, 222.52, 224.61, 70, 82; 42/124–127, 115; 403/256, 261, 373; 285/373, 419, 236
See application file for complete search history.

(56) References Cited

U.S. PATENT DOCUMENTS

| 691,248 | A | * | 1/1902 | De Zeng, Jr. ............. F41G 1/26 |
| | | | | 42/126 |
| 722,910 | A | | 3/1903 | Saegmuller |
| 773,813 | A | * | 11/1904 | Saegmuller ........... F41G 11/001 |
| | | | | 248/231.61 |
| 830,729 | A | * | 9/1906 | Mann .................... F41G 11/003 |
| | | | | 42/126 |

(Continued)

FOREIGN PATENT DOCUMENTS

| CN | 201145779 | 11/2008 |
| CN | 201378019 | 1/2010 |

(Continued)

OTHER PUBLICATIONS

PCT International Search Report and Written Opinion in International Application PCT/US2016/019844, dated May 17, 2016, 14 pgs.

*Primary Examiner* — Ingrid M Weinhold

(57) ABSTRACT

An apparatus includes a mounting ring and a collar. The mounting ring includes an upper ring portion and a lower ring portion secured to the upper ring portion. Each of the upper ring portion and the lower ring portion has an inner ring surface defined by a plurality of radii. The collar is disposed in the mounting ring and includes a substantially cylindrical outer collar surface. The substantially cylindrical outer collar surface is disposed proximate the inner ring surface.

11 Claims, 6 Drawing Sheets

(56) References Cited

U.S. PATENT DOCUMENTS

| | | | | |
|---|---|---|---|---|
| 870,273 | A * | 11/1907 | Burton | F41G 11/003 42/125 |
| 960,813 | A * | 6/1910 | Burton | F41G 11/003 42/124 |
| 1,609,405 | A | 12/1926 | Fagerholm | |
| 2,381,101 | A | 8/1945 | Bausch | |
| 2,548,031 | A * | 4/1951 | Leupold | F41G 11/001 403/188 |
| 2,579,067 | A | 12/1951 | Cunningham | |
| 2,782,509 | A | 2/1957 | Ivy | |
| 2,839,834 | A | 6/1958 | Hardy | |
| 2,911,723 | A * | 11/1959 | Ashbrook | F41G 11/003 42/126 |
| 3,153,856 | A | 10/1964 | Felix | |
| 3,183,594 | A | 5/1965 | Panunzi | |
| 3,315,362 | A | 4/1967 | Palmer | |
| 3,374,544 | A * | 3/1968 | Pitchford | F41G 11/001 42/126 |
| 3,401,460 | A * | 9/1968 | Tellie | F41G 11/003 42/124 |
| 3,611,606 | A | 10/1971 | Sefried et al. | |
| 3,669,523 | A | 6/1972 | Edwards | |
| 3,734,437 | A * | 5/1973 | Underwood | F41G 11/003 248/205.1 |
| 3,828,443 | A | 8/1974 | James | |
| D234,539 | S | 3/1975 | Marchetti | |
| D234,540 | S | 3/1975 | Marchetti | |
| 3,877,166 | A | 4/1975 | Ward | |
| 3,959,888 | A | 6/1976 | Baker | |
| 3,990,155 | A | 11/1976 | Akin, Jr. et al. | |
| 3,994,597 | A | 11/1976 | Calder et al. | |
| 4,208,801 | A | 6/1980 | Blair | |
| 4,264,123 | A | 4/1981 | Mabie | |
| 4,523,818 | A | 6/1985 | Lang et al. | |
| 4,531,052 | A | 7/1985 | Moore | |
| 4,571,870 | A | 2/1986 | Heideman et al. | |
| 4,630,903 | A | 12/1986 | Jones | |
| 4,643,542 | A | 2/1987 | Gibson | |
| 4,695,161 | A | 9/1987 | Reed | |
| 4,776,126 | A * | 10/1988 | Williams | F41G 11/003 42/125 |
| 4,777,754 | A | 10/1988 | Reynolds, Jr. | |
| 4,845,871 | A | 7/1989 | Swan | |
| 5,305,978 | A * | 4/1994 | Current | F16L 3/1075 248/230.4 |
| 5,343,744 | A | 9/1994 | Ammann | |
| 5,363,559 | A | 11/1994 | McCarty | |
| 5,400,540 | A | 3/1995 | Solinsky et al. | |
| 5,408,359 | A | 4/1995 | Ferrett et al. | |
| 5,426,880 | A | 6/1995 | Ruger et al. | |
| 5,430,967 | A | 7/1995 | Woodman, III et al. | |
| 5,433,010 | A | 7/1995 | Bell | |
| 5,506,727 | A | 4/1996 | Douglas et al. | |
| 5,531,031 | A | 7/1996 | Green | |
| 5,584,137 | A | 12/1996 | Teetzel | |
| 5,771,623 | A | 6/1998 | Pernstich et al. | |
| 5,783,745 | A | 7/1998 | Bergman | |
| 5,784,207 | A | 7/1998 | Satoh | |
| 5,920,995 | A | 7/1999 | Sammut | |
| 5,941,489 | A | 8/1999 | Fanelli et al. | |
| 5,973,315 | A | 10/1999 | Saldana et al. | |
| 6,012,229 | A | 1/2000 | Shiao | |
| 6,032,374 | A | 3/2000 | Sammut | |
| 6,185,854 | B1 | 2/2001 | Solinsky et al. | |
| 6,269,581 | B1 | 8/2001 | Groh | |
| 6,363,223 | B1 | 3/2002 | Gordon | |
| 6,442,883 | B1 | 9/2002 | Waterman et al. | |
| 6,453,595 | B1 | 9/2002 | Sammut | |
| 6,508,026 | B1 | 1/2003 | Uppiano et al. | |
| 6,516,551 | B2 | 2/2003 | Gaber | |
| 6,516,699 | B2 | 2/2003 | Sammut et al. | |
| 6,574,901 | B1 | 6/2003 | Solinsky et al. | |
| 6,580,555 | B2 | 6/2003 | Crista | |
| 6,580,876 | B1 | 6/2003 | Gordon | |
| 6,595,473 | B2 * | 7/2003 | Aoki | F16L 3/10 138/108 |
| 6,606,813 | B1 | 8/2003 | Squire et al. | |
| 6,608,298 | B2 | 8/2003 | Gaber | |
| 6,615,531 | B1 | 9/2003 | Holmberg | |
| 6,629,381 | B1 * | 10/2003 | Keng | F41G 11/003 42/124 |
| 6,681,512 | B2 | 1/2004 | Sammut | |
| 6,721,095 | B2 | 4/2004 | Huber | |
| 6,729,062 | B2 | 5/2004 | Thomas et al. | |
| 6,792,206 | B2 | 9/2004 | Gordon | |
| 6,807,742 | B2 | 10/2004 | Schick et al. | |
| 6,813,025 | B2 | 11/2004 | Edwards | |
| 6,819,495 | B2 | 11/2004 | Shani et al. | |
| 6,862,832 | B2 | 3/2005 | Barrett | |
| 6,875,918 | B2 * | 4/2005 | Sudo | H02G 3/0468 138/108 |
| 7,119,275 | B2 * | 10/2006 | Suzuki | H02G 3/0691 174/503 |
| 7,121,037 | B2 * | 10/2006 | Penney | F41G 11/001 42/126 |
| 7,125,126 | B2 | 10/2006 | Yamamoto | |
| 7,129,857 | B1 | 10/2006 | Spirkovska | |
| 7,292,262 | B2 | 11/2007 | Towery et al. | |
| 7,309,054 | B2 * | 12/2007 | Slatter | F16B 2/065 248/521 |
| 7,317,520 | B2 | 1/2008 | Wang et al. | |
| 7,343,707 | B2 | 3/2008 | Smith, III | |
| 7,656,579 | B1 | 2/2010 | Millett | |
| 7,665,699 | B2 * | 2/2010 | Oddsen, Jr. | F16B 2/10 248/220.21 |
| 7,703,679 | B1 | 4/2010 | Bennetts et al. | |
| 7,905,046 | B2 | 3/2011 | Smith, III | |
| 8,006,430 | B2 * | 8/2011 | Wang | F41G 11/003 42/125 |
| D651,682 | S | 1/2012 | Beckett et al. | |
| 8,201,741 | B2 | 6/2012 | Bennetts et al. | |
| 8,353,454 | B2 | 1/2013 | Sammut et al. | |
| 8,397,421 | B2 * | 3/2013 | Ding | F41G 11/003 42/124 |
| 8,555,542 | B2 * | 10/2013 | Ziegler | F41G 11/007 42/124 |
| 8,670,179 | B2 | 3/2014 | Windauer | |
| 8,833,655 | B2 | 9/2014 | McCarty et al. | |
| 8,919,650 | B2 | 12/2014 | Browe et al. | |
| 9,038,901 | B2 | 5/2015 | Paterson et al. | |
| 9,091,507 | B2 | 7/2015 | Paterson et al. | |
| 9,250,036 | B2 | 2/2016 | Farca et al. | |
| 9,423,215 | B2 | 8/2016 | White et al. | |
| 9,482,516 | B2 | 11/2016 | McCarthy et al. | |
| 9,689,643 | B2 | 6/2017 | Farca et al. | |
| 2002/0089752 | A1 | 7/2002 | Morgan, III | |
| 2003/0010190 | A1 | 1/2003 | Sammut et al. | |
| 2003/0145505 | A1 | 8/2003 | Kenton | |
| 2003/0163278 | A1 | 8/2003 | Clark et al. | |
| 2004/0047586 | A1 | 3/2004 | Schick et al. | |
| 2004/0068913 | A1 | 4/2004 | Solinsky et al. | |
| 2004/0082888 | A1 | 4/2004 | Palazzolo et al. | |
| 2004/0088898 | A1 | 5/2004 | Barrett | |
| 2004/0144013 | A1 | 7/2004 | Leatherwood | |
| 2004/0187374 | A2 | 9/2004 | Solinsky et al. | |
| 2004/0231220 | A1 | 11/2004 | McCormick | |
| 2004/0234812 | A1 | 11/2004 | Naito et al. | |
| 2004/0238714 | A1 * | 12/2004 | Slatter | F16B 2/065 248/534 |
| 2005/0002668 | A1 | 1/2005 | Gordon | |
| 2005/0021282 | A1 | 1/2005 | Sammut et al. | |
| 2005/0036109 | A1 | 2/2005 | Blum et al. | |
| 2005/0200959 | A1 | 9/2005 | Yamamoto | |
| 2005/0219690 | A1 | 10/2005 | Lin et al. | |
| 2005/0252062 | A1 | 11/2005 | Scrogin et al. | |
| 2005/0263688 | A1 | 12/2005 | Kauhanen | |
| 2005/0268521 | A1 | 12/2005 | Cox et al. | |
| 2006/0010759 | A1 * | 1/2006 | Penney | F41G 11/001 42/126 |
| 2006/0010760 | A1 | 1/2006 | Perkins et al. | |
| 2006/0162226 | A1 | 7/2006 | Tai | |
| 2006/0164704 | A1 | 7/2006 | Sieczka et al. | |

(56) References Cited

U.S. PATENT DOCUMENTS

| | | |
|---|---|---|
| 2006/0187562 A1 | 8/2006 | Mounnarat et al. |
| 2007/0035824 A1 | 2/2007 | Scholz |
| 2007/0086893 A1 | 4/2007 | Pedersen |
| 2007/0096000 A1* | 5/2007 | Westberg ............... B60K 37/02 248/315 |
| 2007/0097351 A1 | 5/2007 | York et al. |
| 2007/0234626 A1 | 10/2007 | Murdock et al. |
| 2007/0277421 A1 | 12/2007 | Perkins et al. |
| 2008/0007843 A1 | 1/2008 | Schafer |
| 2008/0022576 A1* | 1/2008 | Epling ..................... F41G 1/38 42/124 |
| 2008/0140331 A1 | 6/2008 | Kalinin |
| 2008/0186568 A1 | 8/2008 | Chen et al. |
| 2009/0100735 A1 | 4/2009 | Schick et al. |
| 2009/0223107 A1 | 9/2009 | Lin et al. |
| 2009/0266892 A1 | 10/2009 | Windauer et al. |
| 2010/0024276 A1 | 2/2010 | Kellis |
| 2010/0301116 A1 | 12/2010 | Bennetts et al. |
| 2011/0061286 A1* | 3/2011 | Wang ................... F41G 11/003 42/125 |
| 2011/0075125 A1 | 3/2011 | Kanayama |
| 2011/0099881 A1 | 5/2011 | Jung et al. |
| 2011/0247255 A1* | 10/2011 | Ding .................... F41G 11/003 42/90 |
| 2012/0000979 A1 | 1/2012 | Horvath |
| 2012/0044475 A1 | 2/2012 | Yang et al. |
| 2012/0048931 A1 | 3/2012 | Arbouw |
| 2012/0097741 A1 | 4/2012 | Karcher |
| 2012/0182417 A1 | 7/2012 | Everett |
| 2012/0186130 A1 | 7/2012 | Tubb |
| 2012/0186131 A1 | 7/2012 | Windauer |
| 2012/0298750 A1 | 11/2012 | McCarty et al. |
| 2013/0033746 A1 | 2/2013 | Brumfield |
| 2013/0040268 A1 | 2/2013 | Van Der Walt et al. |
| 2013/0047485 A1 | 2/2013 | Tubb |
| 2013/0170027 A1 | 7/2013 | Peters et al. |
| 2013/0188180 A1 | 7/2013 | Jakob |
| 2013/0199074 A1 | 8/2013 | Paterson |
| 2013/0206836 A1 | 8/2013 | Paterson et al. |
| 2013/0228616 A1 | 9/2013 | Millett |
| 2013/0228618 A1 | 9/2013 | Millett |
| 2013/0276345 A1 | 10/2013 | Hamilton |
| 2013/0312310 A1 | 11/2013 | Geller |
| 2014/0002815 A1 | 1/2014 | Jaeschke et al. |
| 2014/0059915 A1 | 3/2014 | Sammut et al. |
| 2014/0115942 A1 | 5/2014 | Plaster |
| 2014/0319215 A1 | 10/2014 | Farca et al. |
| 2015/0002856 A1 | 1/2015 | McCarthy et al. |
| 2015/0241193 A1 | 8/2015 | Berthiaume |
| 2015/0316350 A1 | 11/2015 | Hamilton |
| 2016/0025455 A1 | 1/2016 | Paterson et al. |
| 2016/0061567 A1 | 3/2016 | Regan et al. |
| 2016/0084616 A1 | 3/2016 | Jahromi |
| 2016/0097628 A1 | 4/2016 | Wu |
| 2016/0146576 A1 | 5/2016 | White et al. |
| 2017/0010068 A1 | 1/2017 | White et al. |
| 2017/0108311 A1 | 4/2017 | Farca et al. |
| 2017/0241742 A1 | 8/2017 | Davidson et al. |
| 2018/0010887 A1 | 1/2018 | VanBecelaere |
| 2018/0024376 A1 | 1/2018 | Dohr et al. |
| 2018/0120058 A1 | 5/2018 | White et al. |
| 2018/0120059 A1 | 5/2018 | White et al. |

FOREIGN PATENT DOCUMENTS

| | | |
|---|---|---|
| CN | 101706232 | 5/2010 |
| CN | 201740465 | 2/2011 |
| CN | 201844750 | 5/2011 |
| CN | 102135786 | 7/2011 |
| CN | 203550785 | 4/2014 |
| DE | 20 2005 015445 | 1/2006 |
| DE | 102011018947 | 10/2012 |
| DE | 10 2012 000525 A1 | 7/2013 |
| EP | 2339290 A2 | 6/2011 |
| WO | 00/50836 | 8/2000 |
| WO | 03/096216 | 11/2003 |
| WO | 2007/108896 | 9/2007 |
| WO | 2010/134738 | 11/2010 |

* cited by examiner

SELF-ALIGNING OPTICAL SIGHT MOUNT

CROSS-REFERENCE TO RELATED APPLICATIONS

This application claims priority to and the benefit of U.S. Provisional Patent Application No. 62/121,612, filed Feb. 27, 2015, the disclosure of which is hereby incorporated by reference herein in its entirety.

INTRODUCTION

Optical devices are mounted to projectile weapons such as rifles, and allow a shooter to accurately aim at a distant target. Various types of mounts exist that are used to secure the optical device to a rifle. Due to incorrect securement of the mount to the rifle, the optical device may be improperly aligned along the rifle. Incorrect securement can be caused by user error, worn parts on the rifle (e.g., picatinny rail) that cause misalignments, or other factors. If the optical device is improperly aligned, excessive forces may act on the optical device, thus damaging the housing of the device, or the rifle may be difficult to properly aim. Certain mounts utilize an outer mounting ring and an inner collar that can move relative to the collar, but such mounts often display insufficient holding forces, which can cause the optical device to inadvertently become misaligned during use.

SUMMARY

In one aspect, the technology relates to an apparatus including a mounting ring including an upper ring portion and a lower ring portion secured to the upper ring portion, wherein each of the upper ring portion and the lower ring portion include an inner ring surface defined by a plurality of radii; and a collar disposed in the mounting ring, wherein the collar includes a substantially cylindrical outer collar surface, wherein the substantially cylindrical outer collar surface is disposed proximate the inner ring surface. In an embodiment, the mounting ring includes a forward surface and a rearward surface, and a ring axis substantially orthogonal to both the forward surface and the rearward surface. In another embodiment, the plurality of radii are measured orthogonal from and along the ring axis. In yet another embodiment, a radius at a first portion of the inner surface substantially midway between the forward surface and the rearward surface is less than a radius of a second portion of the inner surface immediately adjacent the first portion. In still another embodiment, the collar includes a tapered forward edge and a tapered rearward edge. In another embodiment, at least a portion of the cylindrical outer collar surface disposed between the forward surface and the rearward surface is not in contact with the inner ring surface.

In another aspect, the technology relates to an apparatus including: a mounting ring having: a forward surface; a rearward surface; a ring axis extending from the forward surface to the rearward surface; and an inner ring surface extending between the forward surface and the rearward surface, the inner ring surface defined by a plurality of radii measured from the ring axis, wherein the plurality of radii include: a first radius proximate the forward surface; a second radius disposed between the forward surface and the rearward surface, wherein the second radius is greater than the first radius; and a third radius disposed proximate a mid-point of the mounting ring, wherein the third radius is less than the second radius; and a collar disposed in the mounting ring, wherein the collar includes a substantially cylindrical outer collar surface is disposed proximate the inner ring surface. In an embodiment, the mounting ring includes an upper portion and a lower portion. In another embodiment, the collar includes an upper part disposed proximate the upper portion and a lower part disposed proximate the lower portion. In yet another embodiment, the collar includes a collar axis configured to be selectively positionable in a first position that is substantially aligned with the ring axis and a second position that is misalignable from the ring axis. In still another embodiment, when the collar axis is misaligned from the ring axis, at least a portion of the collar projects beyond at least one of the forward surface and the rearward surface. In another embodiment, at least a portion of the cylindrical outer collar surface does not contact the inner ring surface both when the collar axis is positioned in the first position and when the collar axis is positioned in the second position.

In another aspect, the technology relates to an apparatus including: a mounting ring including an inner substantially cylindrical surface and a lobe extending from the inner substantially cylindrical surface, wherein a lobe diameter of the mounting ring at the lobe is less than an inner surface diameter of the mounting ring at the inner cylindrical surface; and a collar disposed in the mounting ring, wherein the collar includes a substantially cylindrical outer collar surface. In an embodiment, the substantially cylindrical outer collar surface includes an outer collar diameter substantially similar to the lobe diameter. In another embodiment, the mounting ring includes a lip disposed at each of a forward surface and a rearward surface of the mounting ring, wherein a lip diameter of at least one of the lips is less than the outer collar diameter. In yet another embodiment, the mounting ring includes a ring axis and the collar includes a collar axis, wherein the collar is positionable so as to be both substantially alignable with and misaligned from the ring axis. In still another embodiment, when the collar axis is misaligned from the ring axis, at least a portion of the collar axis projects beyond at least one of the lips.

In another embodiment of the above aspect, at least a portion of the cylindrical outer collar surface does not contact the inner ring surface when the collar axis is both aligned with and misalignable from the ring axis. In another embodiment, the collar includes a first part and a second part. In still another embodiment, the mounting ring includes an upper portion and a lower portion.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Figure 1:
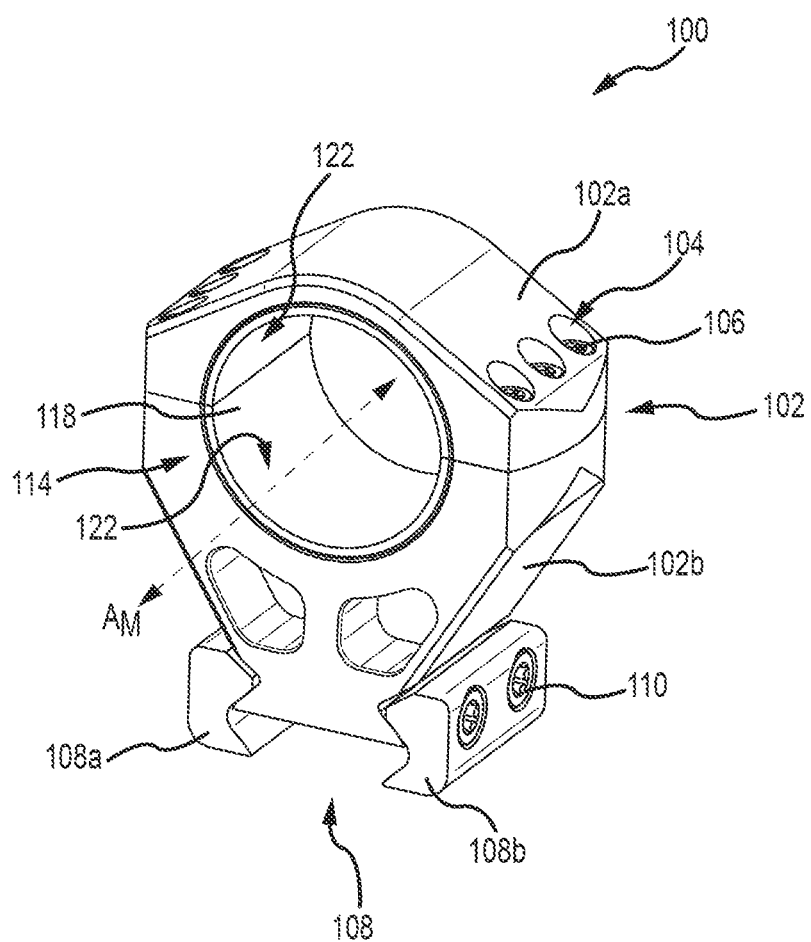
FIG. 1 depicts a front perspective view of an optical device mount in accordance with one embodiment of the present technology.
Figure 2:
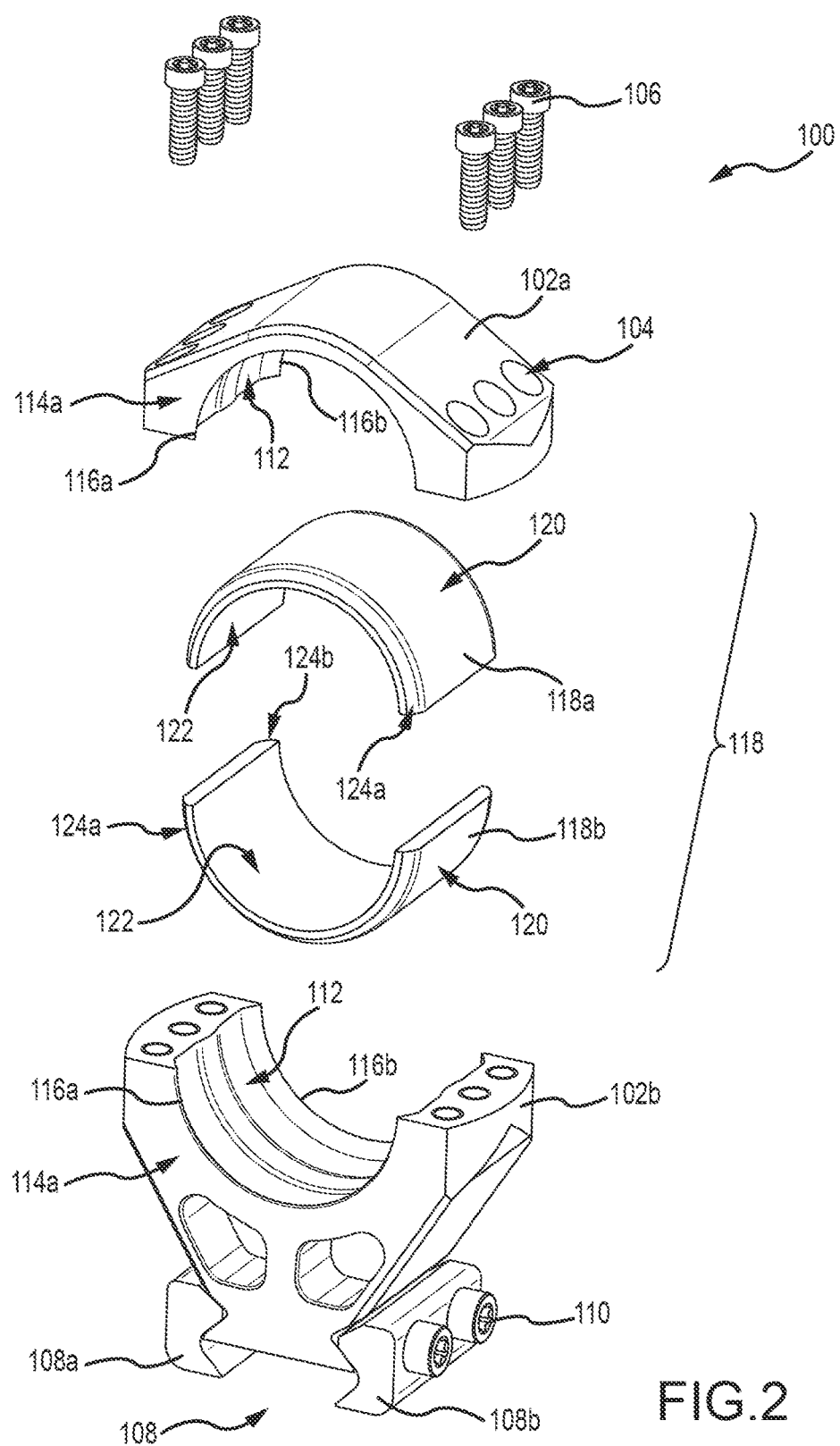
FIG. 2 depicts an exploded front perspective view of the optical device mount of FIG. 1.

FIG. 1 depicts a front perspective view of an optical device mount 100 in accordance with one embodiment of the present technology. FIG. 2 depicts an exploded front perspective view of the mount 100 and is described simultaneously with FIG. 1. The mount 100 includes an outer mounting ring 102 having an upper ring portion 102a and a lower ring portion 102b. The upper ring portion 102a defines a plurality of openings 104 configured to receive screws 106, bolts, or other fasteners that join the upper ring portion 102a and the lower ring portion 102b. The upper ring portion 102a may include a securement element such as a picatinny rail or other element to enable securing of accessories (e.g., lights, sighting lasers, etc.) to the outer mounting ring 102. In the depicted embodiment, however, the upper ring portion 102a has a smooth profile to reduce the likelihood of the mounting ring 102 being caught on branches, clothing, or other objects during use. The lower ring portion 102b may include a clamping mechanism 108 configured to secure the mounting ring 102 to a rifle. In the depicted embodiment, the clamping mechanism 108 includes two discrete clamps 108a, 108b that may be tightened by adjusting one or more screws 110 located thereon. The inner surface 112 of the mounting ring 102 is substantially contoured, as described in more detail below. The mounting ring 102 includes outer surfaces 114 that include both a forward-facing surface 114a and a rearward-facing surface 114b that each includes a lip 116a, 116b. The lips 116a, 116b are portions of the forward- 114a and rearward-facing 114b surfaces that having a smaller radii (as measured from mounting ring axis $A_M$) than a portion of the inner surface 112 immediately adjacent the lip 116a, 116b.

An inner collar 118 is disposed within the mounting ring 102. The collar 118 includes both a substantially cylindrical outer surface 120 and a substantially cylindrical inner surface 122 and may be separated into an upper part 118a and a lower part 118b. When the collar 118 is disposed within the mounting ring 102, the outer surface 120 of the upper part 118a is disposed proximate the inner surface 112 of the upper ring portion 102a, while the outer surface 120 of the lower part 118b is disposed proximate the inner surface 112 of the lower ring portion 102b. The collar 118 is configured so as to be selectively positionable within the mounting ring 102, as described in further detail below. The collar 118 has tapered forward 124a and rearward 124b edges that are configured to interact with the forward lip 116a and the rearward lip 116b, respectively, as described below.

Figure 3:
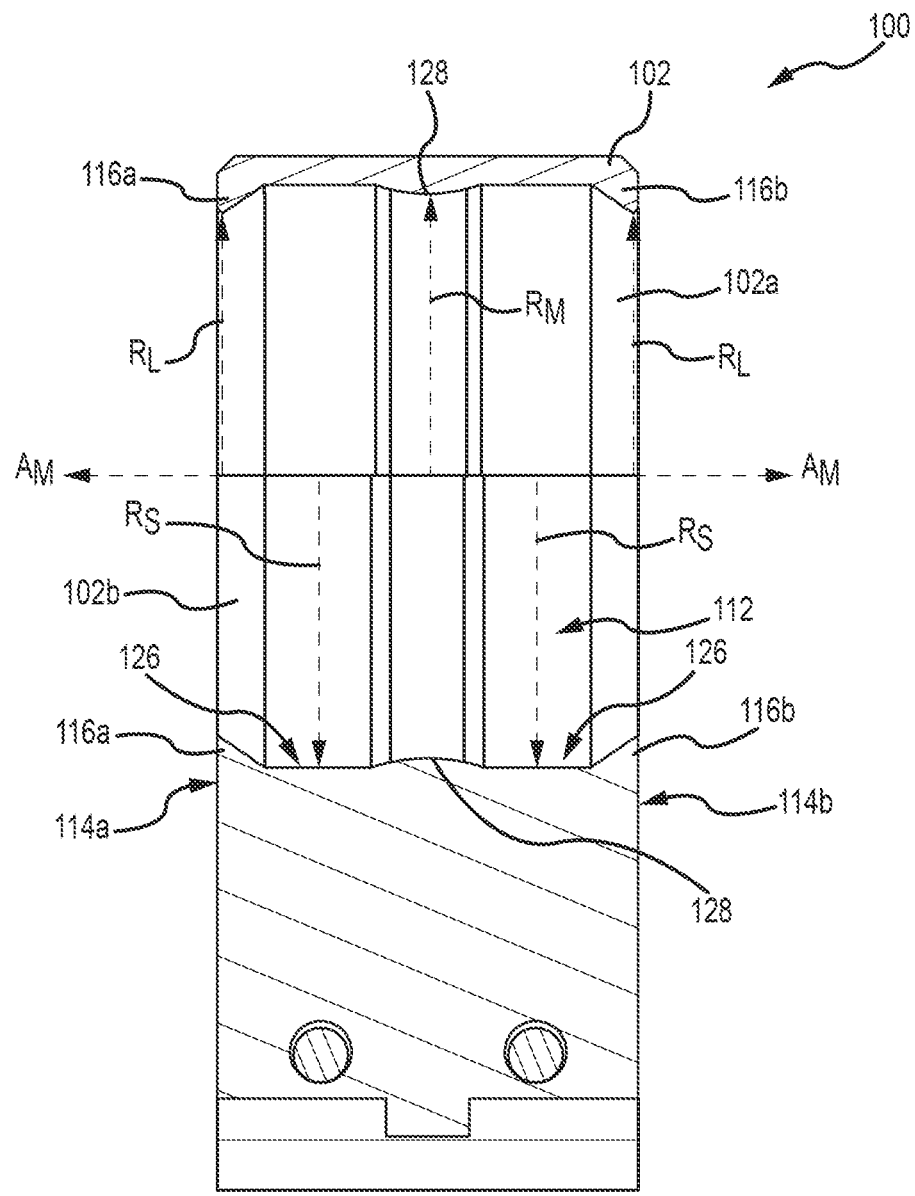
FIG. 3 depicts a partial side sectional view of an optical device mount.

FIG. 3 depicts a partial side sectional view of an optical device mount 100. In this partial view, the inner collar 118 has been removed so as to more clearly depict the contours of the inner surface 112 of the mounting ring 102. In the following description, the contours of the inner surface 112 of the mounting ring 102 are described, without reference to the upper ring portion 102a or lower ring portion 102b specifically, for clarity. It is contemplated that the inner surfaces 112 of the upper ring portion 102a and the lower ring portion 102b are substantially mirror images of each other.

The various radii of portions of the inner surface 112 are depicted relative to the mounting ring axis $A_M$. At both the forward-facing surface 114a and the rearward-facing surface 114b of the mounting ring 102, the lip radius $R_L$ may have the smallest radius of the entire inner surface 112. By utilizing a small radius at the lips 116a, 116b, the inner collar 118 is prevented from sliding out of the mounting ring 102 generally along the mounting ring axis $A_M$. Immediately adjacent the lips 116a, 116b are intermediate portions 126 of the inner surface 112, each having a maximum surface radius $R_S$ that is the largest radius of the inner surface 112, as measured from the mounting ring axis $A_M$. Between and immediately adjacent the intermediate portions 126 of the inner surface 112 is a lobe 128 disposed proximate a midway point between the forward—114a and rearward-facing 114b surfaces. This centrally-located lobe 128 has a central radius $R_M$ that is less than the maximum surface radius $R_S$ but generally greater than the lip radius $R_L$. These varied inner surface 112 radii provide superior holding force over prior art mounting rings that have substantially spherical inner surfaces 112 and collars 118 having substantially spherical outer surfaces, as described in more detail below. The relationship between the inner surface 112 of the mounting ring 102 and the outer surface of the collar 118 is described in FIGS. 4A and 4B.

Figure 4A:
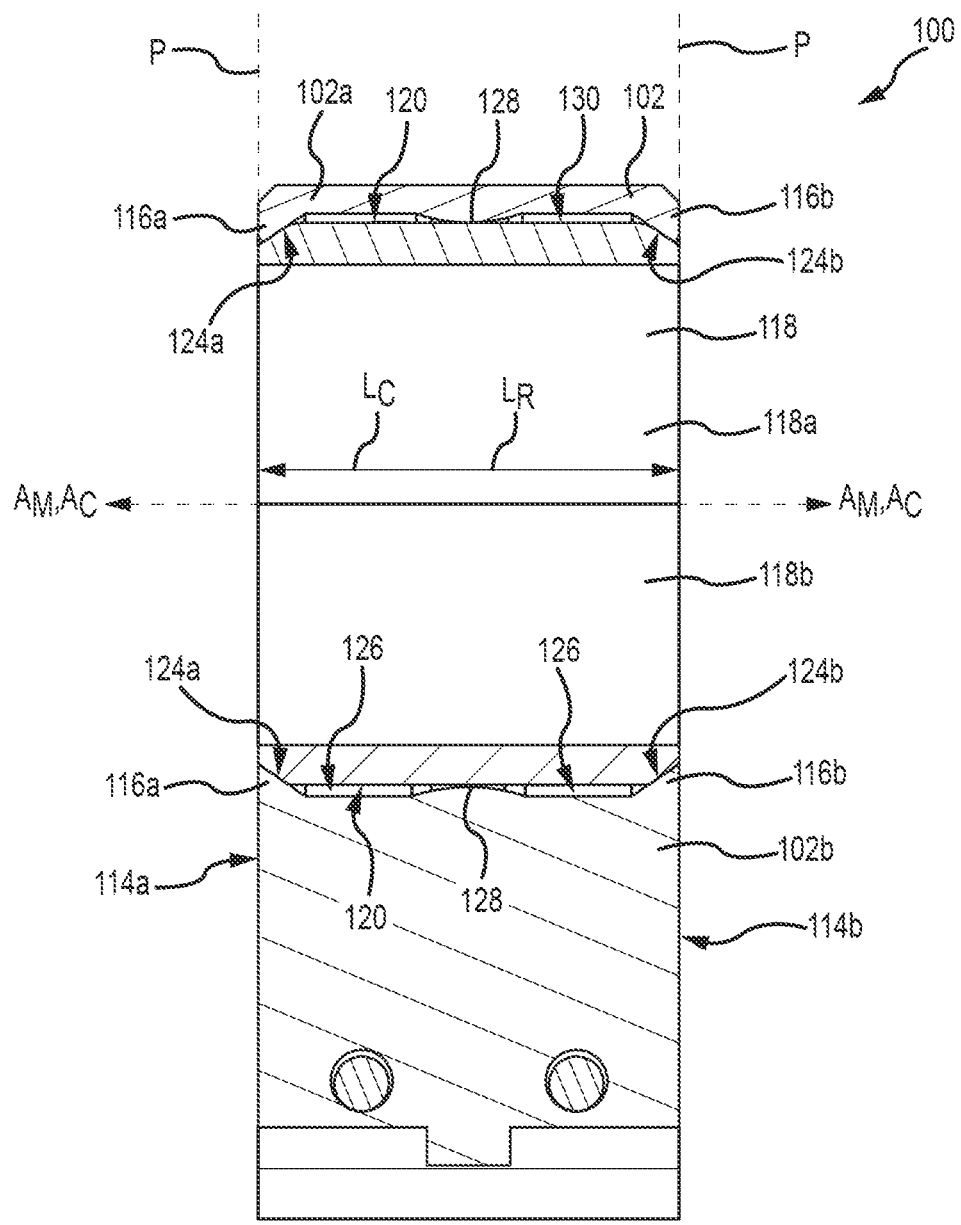
FIG. 4A depicts a side sectional view of an optical device mount having an inner collar in an aligned condition.

FIG. 4A depicts a side sectional view of an optical device mount 100 having an inner collar 118 in an aligned condition. Certain of the dimensions described and depicted in FIG. 3 are not depicted in FIG. 4A. In the aligned condition, the mounting ring axis $A_M$ is substantially aligned with the collar axis $A_C$. In the aligned condition, the outer surface 120 of the collar 118 is in contact with the lobe 128 of the mounting ring 102, while the tapered forward 124a and rearward 124b edges are in contact with portions of the lips 116a, 116b at the forward—114a and rearward-facing 114b surfaces, respectively. In the depicted embodiment, both the tapered forward edge 124a and tapered rearward edge 124b of the collar 118 are substantially aligned with planes P defined by the forward-facing surface 114a and the rearward-facing surface 114b of the mounting ring 102, respectively. If the total length $L_C$ of the collar 118 is the same as the total length $L_R$ of the mounting ring 102, the tapered forward 124a and rearward 124b edges may be aligned with the planes P defined by the forward—114a and rearward-facing 114b surfaces, respectively. In embodiments where the collar 118 has a length $L_C$ less than a length $L_R$ of the mounting ring 102, both of the tapered forward 124a and rearward 124b edges may be disposed between the forward—114a and rearward-facing 114b surfaces. Due to the enlarged radii $R_S$ of the intermediate portions 126 of the inner surface 112 of the mounting ring 102, a gap 130 is located between portions of the outer surface 120 of the collar 118 and the intermediate portions 126 of the inner surface 112 of the mounting ring 102. In certain embodiments, this gap 130 may be about 0.020 inches, when in the aligned condition. Thus, in the aligned condition, the inner collar 118 has three discrete points of contact with the mounting ring 102: the lip 116a at the forward-facing surface 114a, the lobe 128, and the lip 116b at the rearward-facing surface 114b. These three separate points of contact allow for superior holding force between the mounting ring 102 and the inner collar 118.

Figure 4B:
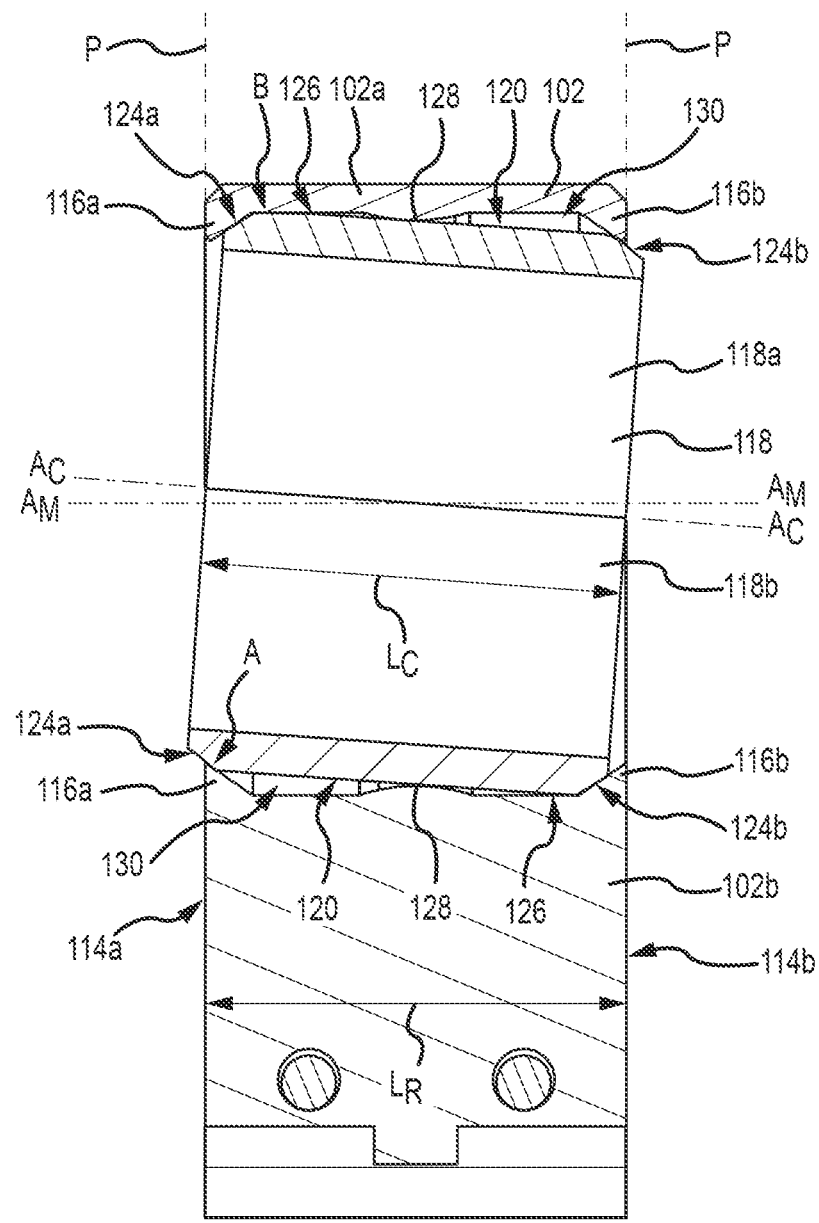
FIG. 4B depicts a side sectional view of an optical device mount having an inner collar in a misaligned condition.

FIG. 4B depicts a side sectional view of an optical device mount having an inner collar 118 in a misaligned condition. Certain of the dimensions described and depicted in FIG. 3 are not depicted in FIG. 4B. In the misaligned condition, the collar axis $A_C$ is misaligned from the mounting ring axis $A_M$. In the misaligned condition, the outer surface 120 of the collar 118 is in contact with the lobe 128 of the mounting ring 102. As depicted in FIG. 4B, contact between the collar 118 and the mounting ring 102 proximate the forward-facing surface 114a, is at the lip 116a (at location A). Additionally, if the misalignment is substantial, there may be contact between a portion of the inner collar 118 and the intermediate portions 126 of the inner surface 112 (at location B). This is a change from the aligned condition, where the intermediate portions 126 do not contact the outer surface 120 of the collar 118. This contact at location B prevents further misalignment of the collar axis $A_C$ relative to the mounting ring axis $A_M$. By limiting the maximum degree of misalignment, damage to the optical device contained within the inner collar 118 is minimized or eliminated, since the collar 118 can be dimensioned such that the optical device will not contact the mounting ring 102 at maximum misalignment. In the misaligned condition, both the tapered forward edge 124a and tapered rearward edge 124b of the collar 118 may extend beyond the planes P defined the forward-facing 114a surface and the rearward-facing 114b surface of the mounting ring 102, respectively. The amount of extension beyond the planes may be dependent upon the total length $L_C$ of the collar 118. In embodiments where the collar 118 has a length $L_C$ less than a length $L_R$ of the mounting ring 102, both of the tapered forward 124a and rearward 124b edges may not necessarily extend beyond the planes P defined by the forward—114a and rearward-facing 114b surfaces. Due to the enlarged radii (relative to the radii at the lobe 128 and lips 116a, 116b) of the intermediate portions 126 of the inner surface 112 of the mounting ring 102, gaps 130 are still present between portions of the outer surface 120 of the collar 118 and the intermediate portions 126 of the inner surface 112. Thus, in the misaligned condition, the inner collar 118 maintains three discrete points of contact with the mounting ring 102. These three separate points of contact allow for superior holding force between the mounting ring 102 and the inner collar 118, even when misaligned. In certain embodiments, misalignment between the collar axis $A_C$ and mounting ring axis $A_M$ may be up to about 3 degrees. In other embodiments, maximum misalignment may be up to about 5 degrees. Other maximum misalignments are contemplated.

Figure 5:
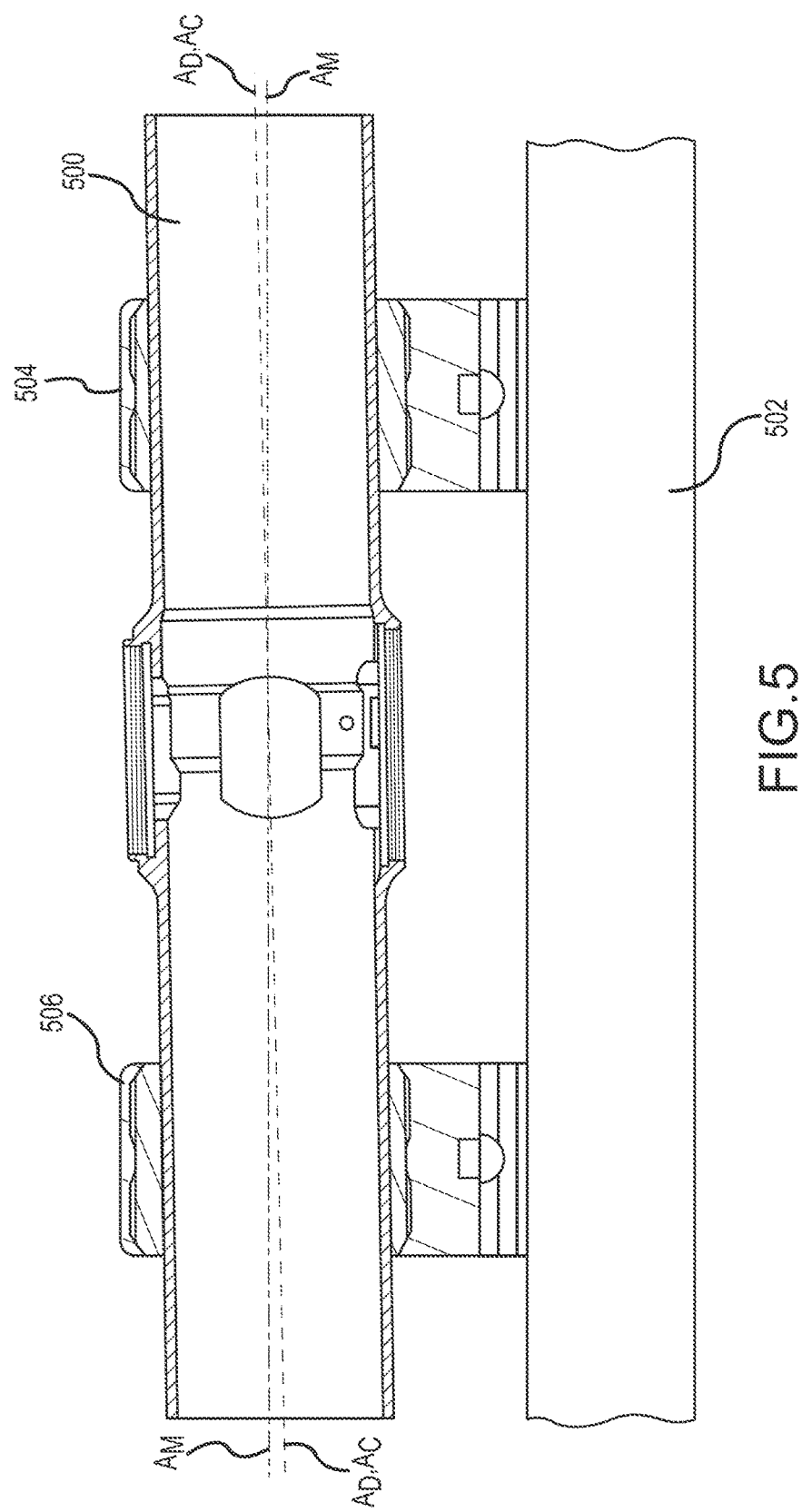
FIG. 5 depicts a side sectional view of an optical device mounted to a rifle with two optical device mounts.

FIG. 5 depicts a side sectional view of an optical device 500 mounted to a rifle 502 with two optical device mounts 504, 506. As can be seen, the collar axes $A_C$ of both front 504 and rear mounting rings 506 are misaligned from their respective mounting ring axes $A_M$. This misalignment causes a corresponding misalignment of the optical device axis $A_D$. In the depicted embodiment, the misalignment of the front and rear mounting rings 504, 506 creates a cant of up to about 60 MOA. Therefore, the mounting rings 504, 506 described herein can provide significant cant to the optical device 500 without the need for additional hardware between the rifle and the mount. This helps reduce the likelihood of hardware, clamps, etc., being displaced or loosened during use.

As described above, the mounting ring having an inner surface of varying radii displays superior holding power over mounting rings that include a mounting ring and inner collar both having concentric spherical mating contours. Table 1 below depicts comparative test results between a mounting ring manufactured in accordance with the present disclosure ("New Ring") versus a concentric spherical mounting ring and collar (available as the "Signature Ring" from Burris Company of Greeley, Colo.). Additionally, test data for a metal mounting ring without an inner collar (available as the "Xtreme Tactical Ring-XTR" from Burris Company) is also included for comparison.

TABLE 1

Comparative Test Results
Ring Testing Protocol

| Test Requirement | Test Description Samples | Displacement of scope in ring mount (in) | | |
|---|---|---|---|---|
| | | New Ring | XTR Ring | Signature Ring |
| Static Test | Hydraulic Press PSI @ Initial Displacement | 900 | 1400 | 760 |
| Light Recoil Test | 5000 Cycles @ 250 g | 0 | 0 | 0 |
| Heavy Recoil Test 1 | 5 cycles @ 850 g | 0 | 0 | 0.078 |
| Heavy Recoil Test 2 | 25 cycles @ 850 g | 0.003 | 0 | Failed |
| Heavy Recoil Test 3 | 50 cycles @ 850 g | 0.006 | 0.003 | — |
| Heavy Recoil Test 4 | 75 cycles @ 850 g | 0.011 | 0.011 | — |
| Heavy Recoil Test 5 | 100 cycles @ 850 g | 0.019 | 0.025 | — |

As depicted in the test results, the New Ring displayed improved static holding force than the Signature Ring, but displayed slightly less static holding force than the XTR Ring. Notably, the recoil test results indicate that the Signature Ring (with a metal mounting ring and plastic inner collar) began to slip and failed after 25 shots. The New Ring, however, with a metal mounting ring and plastic inner collar displayed greatly improved holding force that rivaled the XTR Ring. Additionally, the New Ring has the advantages of offsetting the scope and does not damage the optical device body tube. The XTR Ring, with an all-metal mounting ring and no plastic inner collar, does not display such advantages.

The various elements of the mounting rings depicted herein may be manufactured of any materials typically used in optical device mounts. Such materials include for the mounting ring, but are not limited to, cast or machined steel, stainless steel, aluminum, titanium, etc. Inner collars may be manufactured of robust plastics such as homopolymer acetals, amorphous thermoplastic polyetherimide (PEI), and polyether ether ketone. Such plastics are available under the names Delrin™, Ultem™, and Peek, manufactured by companies such as DuPont, Dow, and so on.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus for mounting an optical device, the apparatus comprising:
   a mounting ring comprising:
   a forward surface;
   a rearward surface;
   a lip disposed at each of a forward surface and a rearward surface of the mounting ring;
   a ring axis extending from the forward surface to the rearward surface; and
   an inner ring surface extending between the forward surface and the rearward surface, the inner ring surface defined by a plurality of radii measured from the ring axis, wherein the plurality of radii comprise:
a first radius proximate the forward surface;
a second radius disposed between the forward surface and the rearward surface, wherein the second radius is greater than the first radius;
a third radius disposed at a mid-point of the mounting ring, wherein the third radius is less than the second radius; and
a fourth radius disposed between the mid-point of the mounting ring and the rearward surface, wherein the fourth radius is substantially equal to the second radius; and
a collar pivotably disposed in the mounting ring, wherein the collar comprises a tapered forward edge, a tapered rearward edge, and a substantially cylindrical outer collar surface extending a full length therebetween, and wherein the tapered forward edge engages the lip disposed at the forward surface, and wherein the tapered rearward edge engages the lip disposed at the rearward surface, and wherein engagement of the respective lips at the respective tapered edges prevents the collar from moving axially out of the mounting ring.

2. The apparatus of claim 1, wherein the mounting ring comprises an upper portion and a lower portion.

3. The apparatus of claim 2, wherein the collar comprises an upper part disposed proximate the upper portion and a lower part disposed proximate the lower portion.

4. The apparatus of claim 1, wherein the collar comprises a collar axis, the collar configured to be selectively positionable in a first position in which the collar axis is substantially aligned with the ring axis and a second position in which the collar axis is misaligned from the ring axis.

5. The apparatus of claim 4, wherein when the collar axis is misaligned from the ring axis, at least a portion of the collar projects beyond at least one of the forward surface and the rearward surface.

6. The apparatus of claim 4, wherein at least a portion of the cylindrical outer collar surface does not contact the inner ring surface both when the collar axis is positioned in the first position and when the collar axis is positioned in the second position.

7. An apparatus for mounting an optical device, the apparatus comprising:
a mounting ring comprising:
a ring axis;
a lip disposed at each of a forward surface and a rearward surface of the mounting ring; and
an inner surface comprising:
a lobe disposed at a midpoint of the mounting ring; and
an intermediate surface disposed on either side of the lobe and extending respectively towards each of the forward surface and the rearward surface, and wherein a lobe diameter of the mounting ring at the lobe is less than an intermediate surface diameter of the mounting ring at the intermediate surface; and
a collar disposed in the mounting ring, wherein the collar comprises (a) a substantially cylindrical outer collar surface having an outer collar diameter similar to the lobe diameter and (b) a collar axis, wherein the collar is positionable:
in a first position where the collar axis is substantially aligned with the ring axis and wherein no portion of the collar projects beyond both of the lips, and
in a second position where the collar axis is substantially misaligned from the ring axis and wherein at least a portion of the collar projects beyond at least one of the lips, and wherein a lip diameter of both of the lips is less than the outer collar diameter so as to secure the collar within the mounting ring in the first position and the second position.

8. The apparatus of claim 7, wherein at least a portion of the cylindrical outer collar surface does not contact at least one of the intermediate surfaces when the collar axis is both aligned with and misaligned from the ring axis.

9. The apparatus of claim 7, wherein the collar comprises a first part and a second part.

10. The apparatus of claim 7, wherein the mounting ring comprises an upper portion and a lower portion.

11. An apparatus for mounting an optical device, the apparatus comprising:
a mounting ring comprising a forward surface, a rearward surface, a ring axis, an intermediate surface, and a lobe disposed at a mid-point of the mounting ring along the ring axis, wherein a lobe diameter of the mounting ring at the lobe is less than an intermediate surface diameter of the mounting ring at the intermediate surface; and
a collar disposed in the mounting ring, wherein the collar comprises a substantially cylindrical outer collar surface and a collar axis and wherein the collar is adjustable between a first position and a second position, and wherein a collar diameter is similar to the lobe diameter
wherein when in the first position the ring axis and collar axis are aligned, no portion of the collar extends beyond the forward surface and the rearward surface, and the cylindrical outer collar surface does not contact the intermediate surface; and
wherein when in the second position the ring axis and collar axis are misaligned, a forward portion of the collar and a rearward portion of the collar extends beyond the forward surface and the rearward surface, respectively, and at least a portion of the cylindrical outer collar surface contacts the intermediate surface.

* * * * *